United States Patent
Tada

[11] Patent Number: 5,871,552
[45] Date of Patent: Feb. 16, 1999

[54] PROCESS OF PREPARING ELECTRODE FOR SOLID POLYMER ELECTROLYTE FUEL CELL

[75] Inventor: Tomoyuki Tada, Kanagawa, Japan

[73] Assignees: Tanaka Kikinzoku Kogyo K.K.; Masahiro Watanabe, both of Japan; Stonehart Associates, Inc., Madison, Conn.

[21] Appl. No.: 754,695

[22] Filed: Nov. 21, 1996

[30] Foreign Application Priority Data

Feb. 14, 1996 [JP] Japan ................................ 8-052335

[51] Int. Cl.⁶ .................................................. H01M 4/88
[52] U.S. Cl. ........................ 29/623.5; 427/115; 205/101
[58] Field of Search .................... 429/40.42, 45; 427/115; 29/623.1, 623.5; 502/101

[56] References Cited

U.S. PATENT DOCUMENTS 5,538,585  7/1996  Wakita et al. .................. 427/115 X
5,561,000  10/1996  Dirven et al. ........................ 429/42

*Primary Examiner*—Anthony Skapars
*Attorney, Agent, or Firm*—Klauber & Jackson

[57] ABSTRACT

Disclosed is a process of preparing an electrode for a solid polymer electrolyte fuel cell which comprises applying a suspension liquid containing a catalyst and ion exchange resin or a catalyst, Ion exchange resin and hydrophobic resin to an electrode substrate, and forming a catalyst layer by drying, sintering the substrate under pressure characterized in that a high boiling point solvent which cannot be removed during the drying procedure is added to the suspension liquid. In this process, the high boiling point solvent such as glycerin and n-butanol which is not removed during the drying step is present in the pressurizing and sintering steps so that the situation of the catalyst layer is maintained constant scarcely influenced by the conditions of the said steps. The above solvent imparts pertinent softness to the ion exchange resin so as not to fill the pores for gas diffusion in the catalyst layer and to sufficiently bond the pieces of the ion exchange having the role of conducting H⁺ conduction to obtain the electrode having the excellent electrode characteristics.

7 Claims, 1 Drawing Sheet

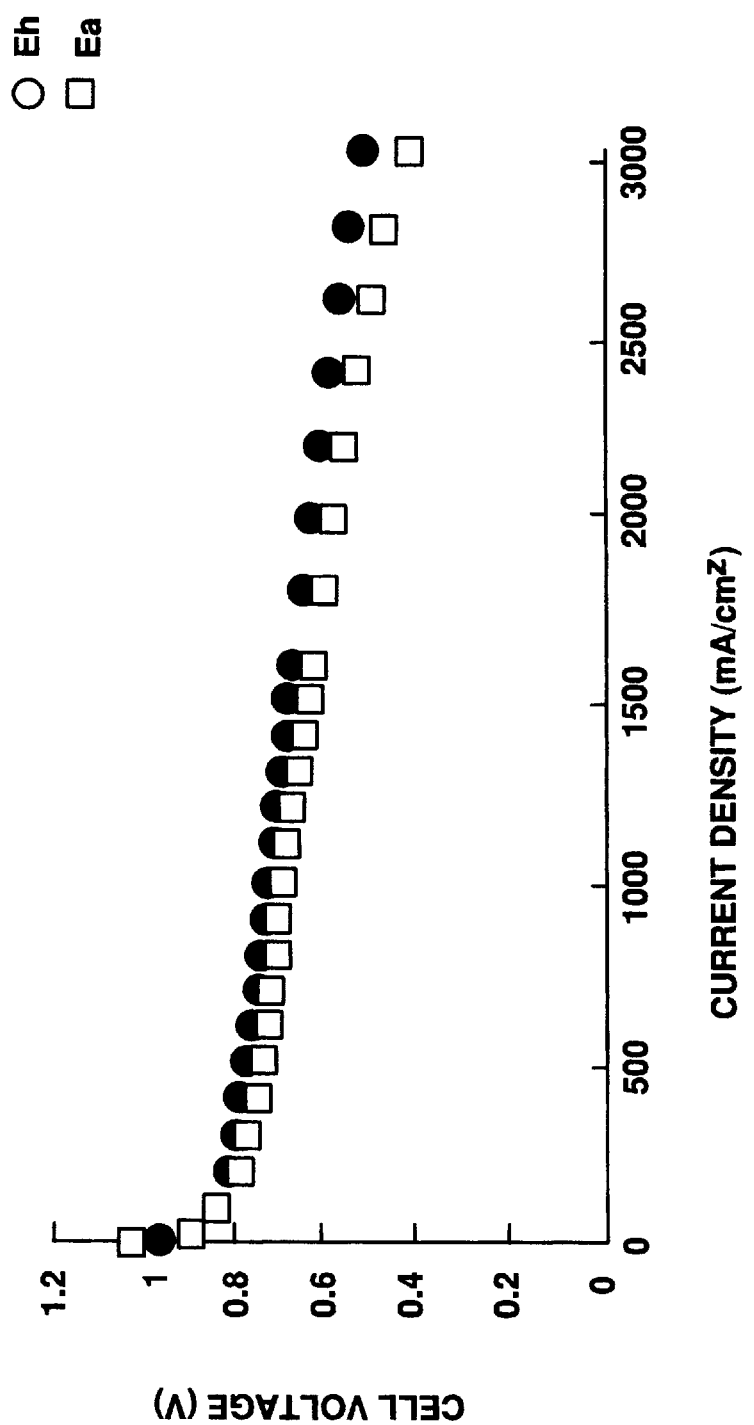

PROCESS OF PREPARING ELECTRODE FOR SOLID POLYMER ELECTROLYTE FUEL CELL

BACKGROUND OF THE INVENTION

The present invention relates to a process of preparing an electrode for a solid polymer electrolyte fuel cell.

Conventionally, an electrode for a solid polymer electrolyte fuel cell is prepared by applying a suspension liquid which is prepared by suspending a catalyst and ion exchange resin or a catalyst, ion exchange resin and hydrophobic resin in a mixed solution composed of an organic solvent and water, to an electrode substrate by means of screen printing, and forming a catalyst layer by means of drying and sintering the substrate under pressure.

If the drying is insufficient in the printing and drying procedures of the above process, the electrode characteristics are lowered. If, on the other hand, the drying is excessive, the characteristics are also lowered. This is because the ion exchange resin fills fine pores with itself it the catalyst layer so that the gas diffusion hardly occurs in case of the insufficient drying and the pieces of the ion exchange resin which have a role of conducting $H^+$ conduction are insufficiently bonded with each other in case of the excessive drying.

SUMMARY OF THE INVENTION

In view of the above drawbacks, an object of the present invention is to provide a process of preparing an electrode for a solid polymer electrolyte fuel cell in which pores for gas diffusion in a catalyst layer are not filled and pieces of ion exchange resin having a role of conducting $H^+$ conduction are sufficiently bonded with each other.

The present invention is a process of preparing an electrode for a solid polymer electrolyte fuel cell which comprises applying a suspension liquid containing a catalyst and ion exchange resin or a catalyst, ion exchange resin and hydrophobic resin to an electrode substrate, and forming a catalyst layer by drying and sintering the substrate under pressure characterized in that a high boiling point solvent which cannot be removed during the drying procedure is added to the suspension liquid.

In accordance with the present invention, the high boiling point solvent which is not removed during the drying step is present in the pressurizing and sintering steps so that the situation of the catalyst layer after the pressurizing and sintering stepes is maintained constant scarcely influenced by the conditions of the said steps. The above solvent imparts pertinent softness to the ion exchange resin so as not to fill the pores for gas diffusion with itself in the catalyst layer and to sufficiently bond the pieces of the ion exchange having the role of conducting $H^+$ conduction to provide the electrode for the solid polymer electrolyte fuel cell.

The above solvent is desirably an alcoholic solvent which has a boiling point not less than 100° C. and a valence of 1, 2 or 3, especially, glycerin. The most suitable addition effects of the solvent can be obtained when it is added in the range of between one-fourth and four times of the weight of the ion exchange resin.

BRIEF DESCRIPTION OF THE DRAWING

FIG. 1 is a graph showing the relation between the respective voltages and current densities of electrodes of Example 1 and Comparative Example 1.

DETAILED DESCRIPTION OF THE INVENTION

As mentioned, the solvent added to the suspension liquid is preferably alcoholic solvent having a boiling point not less than 100° C. and a valence of 1, 2 or 3. For example, butanol (boiling point: 117° C.), glycerin (boiling point: 290° C.) and 2-ethoxyethanol are preferable.

The reason the boiling point of the solvent added to the suspension liquid is preferably not less than 100° C. is that a solvent having a boiling point below 100° C. is likely to disappear during the drying. The reason the alcoholic solvent having the valence of 1, 2 or 3 is preferable is compatibility (producing no turbidity or the like) between the paste of the ion exchange resin dissolved in an alcoholic solvent usually commercially available of which main components are the alcohol and water, and the above alcoholic solvent, and that the solvent having a valence of 4 or more is difficult to be removed in the subsequent steps. However, even if a scarce amount of the solvent is left, it is decomposed during the initial stage of an electrolysis procedure employing the electrode so that no serious problem arises.

As mentioned, the amount of the solvent added is preferably is in the range of between one-fourth and four times of the weight of the ion exchange resin. The reasons of employing this addition range are that no addition effects can be observed compared with complete drying so that the pieces of the ion exchange resin are not sufficiently bonded if below one-fourth of the solvent is employed, and that the amount of the solvent is excessive so that pores for gas diffusion are filled with the solvent when the catalyst layer is formed by pressurizing and sintering to lower electrode characteristics if over four times of the solvent is employed.

The high boiling point solvent in the present invention means, as mentioned, a solvent which is not removed during a series of drying procedures which includes adding the solvent to the suspension liquid and drying, pressurizing and sintering the solvent, and which remains in the suspension liquid at the time of the pressurizing and sintering.

The suspension liquid may be prepared by adding the solvent to the catalyst and the ion exchange resin (powdery or solution) or to the catalyst, the ion exchange resin and the hydrophobic resin and by sufficient agitating the mixture. Ordinarily, water is added other than the above solvent, and other low boiling organic solvents than the above high boiling point solvent can be added.

The catalyst metal employed In the present invention is desirably such a precious metal as platinum, gold, palladium, ruthenium and iridium, and its alloy or oxide.

It is desirable that these catalyst metal particles are supported on an electroconductive carrier. While the carrier is not especially restricted if it is electroconductive, a carbon carrier of which a main component is carbon such as acetylene black, graphitized furnace black and active carbon is preferably employed. The carrier desirably possesses a surface area of about 30 to 2000 $m^2/g$ and a particle diameter of about 100 to 5000 Å. The catalyst may be prepared in accordance with an ordinary thermal decomposition method.

As the ion exchange resin, perfluorocarbon resin having a sulphonic acid group, a carboxylic acid group or the like as an ion exchange group (for example, Nafion available from Du Pont) may be employed, and as the resin, polytetrafluoroethylene (PTFE) and fluorinated ethylene propylene may be employed.

As mentioned, since the solvent which is not removed during the drying step is added to the suspension liquid applied to the electrode substrate in the process of the present invention, only the said solvent except for the solids is left after the suspension liquid is applied to the electrode substrate and dried. In other words, while the situations after the drying are largely influenced by means of drying conditions so that the electrode performances obtained may change in case of employing a low boiling point solvent, the situation under drying in the present invention is seldom affected by means of the drying conditions and nearly constant to provide a catalyst layer having constant performances because the boiling point of the solvent employed is high. Accordingly, when the substrate is pressurized and sintered in this situation, the ion exchange resin is always made properly softer so that the pores are not filled and the pieces of the ion exchange resin are bonded with each other. As a result, the electrode for the solid polymer electrolyte fuel cell which is excellent in the electrode characteristics and possesses the catalyst layer having the good gas diffusion and $H^+$ conduction can be obtained.

EXAMPLES

Although Examples of preparing the electrode for the solid polymer electrolyte fuel cell in accordance with the present invention will be illustrated, these are not construed to restrict the invention.

Example 1

After paste obtained by mixing 1.48 g of a Pt(30%)-supported carbon carrier, 10 g of a concentrated liquid of an ion exchange resin (tradename: Nafion, 5%) solution, 4 g of distilled water and 1 g of glycerin in a planetary ball mill for 30 minutes was printed on carbon paper hydrophobically treated functioning as an electrode substrate having a thickness of 400 μm and dried at 120° C. for 30 minutes, a catalyst layer was formed by pressurizing and sintering the carbon paper at 130° C. and 20 kg/cm² for one minute to provide an electrode carrying Pt at a concentration of 1 mg/cm².

The relation between voltages and current densities of the electrode of this Example thus obtained (electrode area: 25 cm²) was measured under the conditions that a cell inner temperature was 80° C., and a hydrogen gas at two atmospheric pressure and an oxygen gas at three atmospheric pressure were each supplied at 1 l/minute. The result is shown in a graph of FIG. 1 employing ●Eb.

Comparative Example 1

An electrode carrying Pt at a concentration of 1 mg/cm² was prepared under the same conditions as those of Example 1 except that glycerin was not added when preparing the paste.

The relation between voltages and current densities of the electrode of this (Comparative Example thus obtained (electrode area: 25 cm²) was measured under the conditions that a cell inner temperature was 80° C., and a hydrogen gas at two atmospheric pressure and an oxygen gas at three atmospheric pressure were each supplied at 1 l/minute. The result is shown in a graph of FIG. 1 employing □Ea.

It is apparent from the graph of FIG. 1 that the electrode of Example 1 (Eb) is more excellent in the electrode characteristics than the electrode of Comparative Example 1 (Ea). This is conjectured that since the glycerin which was not removed during the drying step was added to the suspension liquid to be applied to the electrode substrate in the electrode of Example 1 only the glycerin remained in the catalyst layer upon the application and drying so that the ion exchange resin was made properly softer not to fill the pores with itself and was bonded to provide the electrode with the excellent electrode characteristics having the catalyst layer excellent in the gas diffusion and the $H^+$ conduction.

Example 2

An electrode was prepared under the same conditions as those of Example 1 except that 1 g of butanol was employed in place of the glycerin, and the relation between voltages and current densities employing the said electrode under the same conditions was measured and the result was similar to that of Example 1.

What is claimed is:

1. A process for preparing an electrode for a solid polymer fuel cell which comprises the steps of:
    (a) applying a liquid suspension containing a catalyst, an ion exchange resin and a high boiling solvent which has a boiling point of not less than 100° C. and a valence of 1, 2 or 3 to an electrode substrate;
    (b) drying the resultant electrode substrate so as to form a catalyst layer on the substrate, said solvent not being removed during the drying step; and
    (c) sintering the electrode substrate resulting from step (b) under pressure.

2. The process as claimed in claim 1 wherein the solvent is an alcohol.

3. The process as claimed in claim 1 wherein the solvent is glycerin.

4. The process as claimed in claim 1 wherein the solvent is butanol.

5. The process as claimed in claim 1 wherein the solvent is 2-ethoxyethanol.

6. The process as claimed in claim 1, wherein the amount of solvent contained in the liquid suspension is in the range of one-fourth to four times the weight of the ion exchange resin.

7. The process as claimed in claim 1, wherein the liquid suspension also contains a hydrophobic resin.

* * * * *